United States Patent

Baker et al.

[11] 3,814,520
[45] June 4, 1974

[54] METHOD OF, AND APPARATUS FOR GAUGING, INSPECTING OR MEASURING PHYSICAL PROPERTIES OF OBJECTS

[75] Inventors: Lionel Richard Baker, Orpington; Barry John Biddles, Sidcup; Thomas Llewellyn Williams, Chislehurst, all of England

[73] Assignee: Sira Institute, Chislehurst, Kent, England

[22] Filed: May 28, 1971

[21] Appl. No.: 148,104

[52] U.S. Cl.................. 356/71, 250/211, 356/164, 356/156
[51] Int. Cl........................ G06k 9/08, G01b 11/00
[58] Field of Search............ 356/71, 156, 159, 160, 356/164–168, 171; 350/160 SF; 250/200, 211

[56] References Cited
UNITED STATES PATENTS

| | | | |
|---|---|---|---|
| 3,240,108 | 3/1966 | Lehan et al. | 356/71 |
| 3,496,404 | 2/1970 | Wendland | 250/211 R |
| 3,518,007 | 6/1970 | Ito | 356/159 UX |
| 3,695,766 | 10/1972 | Giglio | 356/141 |

OTHER PUBLICATIONS

"Laboratory Determination of MTF From Line Spread Function;" Defense Eng. October, 1967.

*Primary Examiner*—Ronald L. Wibert
*Assistant Examiner*—Conrad Clark
*Attorney, Agent, or Firm*—Sughrue, Rothwell, Mion, Zinn and Macpeak

[57] ABSTRACT

An apparatus for gauging inspecting or measuring properties of objects and employing a detecting device receiving light from an image of the object which light is influenced in accordance with the property under investigation. The detecting device has an array of photo-electric elements or sensors which are separated by the use of masks or other means into two units each exhibiting a sinusoidal variation in sensitivity to the light received along a particular direction. The sinusoidal variations of the units are mutually displaced by 90 electrical degrees so that the device can produce electrical signals corresponding to the real and imaginary parts of a Fourier transform of the distribution of intensity of light in the image. These signals are processed to extract information about the property under investigation.

32 Claims, 11 Drawing Figures

METHOD OF, AND APPARATUS FOR GAUGING, INSPECTING OR MEASURING PHYSICAL PROPERTIES OF OBJECTS

BACKGROUND TO THE INVENTION

The present invention relates to a method of, and apparatus for gauging, inspecting or measuring physical properties of objects.

Typical application of the invention are: (i) gauging the size of fibres, wires, apertures, rods or the like, (ii) measuring the optical transfer function of a lens, or (iii) inspecting the quality of a cathode ray tube spot or the output of an image intensifier. It is to be understood however that these applications are given by way of example only.

Apparatuses are known which determine the Fourier transform of the distribution of intensity across an optical image. In the main these known apparatuses required the use of a grid or grating which is moved at a constant velocity over the image of the object in order to scan the image. In this respect reference is made to U.S. Pat. No. 3,450,889. Although the known type of apparatus of this kind is satisfactory the response time of the apparatus is relatively slow and its cost is substantial. Nevertheless in high grade applications this type of apparatus is wholly acceptable since its accuracy is high.

There is, however, a need for an apparatus which will dispense with movable parts and have a higher speed of response but with lower accuracy. It is also envisaged that such an apparatus would be less costly than the aforementioned apparatus.

A general object of this invention is to provide a method of, and apparatus for, gauging, inspecting or measuring objects which will meet this need.

SUMMARY OF THE INVENTION

The Fourier transformation process applied to a mathematical function of an independent variable to produce a transform of the function may be expressed in various detailed forms, but always comprises the well known steps of multiplying the function by a sinusoidal function of the same independent variable and integrating the result to form a component of a value of the transform. The transform will depend on the original function and on the period of the sinusoidal function. However, it is customary to express the Fourier transform as a function of a frequency which is defined as the reciprocal of said period, and the frequency may be called a transformed independent variable whereof the transform is a function.

In the application of the Fourier transformation process to this invention the function to be transformed is a physical property of the object or of an image of the object, the property being a function of a distance or like spatial variable measurable in the object or image, this distance or spatial variable being the independent variable with respect to which the transformation is to be performed. The sinusoidal function is a function of the same distance or spatial variable, the form of the function being explained hereinafter in more detail. The sinusoidal function has a period which is measured in terms of that distance or spatial variable and the reciprocal of its period is the transformed independent variable. The transformed independent variable, being a frequency in the sense generally understood in relation to a Fourier transform, and being expressed in the same units as the spatial variable of which the function to be transformed is a function, is referred to herein as a spatial frequency. It is to be understood that the expressions "phase" and "quadrature" have the usual mathematical meanings, and that these meanings are applied to the invention have spatial rather than temporal significance unless the context otherwise requires. Likewise, "variation" does not necessarily imply variation as a function of time.

According to one aspect of the invention there is provided a method of gauging, inspecting or measuring some physical property of an object; said method comprising forming an image of the object on a detecting device composed of at least two units sensitive to electromagnetic radiation, each unit exhibiting a sinusoidal distribution in sensitivity to said radiation along a predetermined path with the sinusoidal distribution of one unit being effectively displaced by a quarter of the period thereof in relation to the other unit so as to produce separate electrical signals indicative of the real and imaginary parts of a Fourier transform of the distribution of intensity of radiation in said image at one or more spatial frequencies.

In another aspect the invention provides an apparatus for gauging, inspecting or measuring some physical property of an object; said apparatus including a detecting device for receiving an image of the object, said device being composed of at least two units sensitive to electro-magnetic radiation, each unit exhibiting a sinusoidal distribution in sensitivity to said radiation along a predetermined path with the sinusoidal distribution of one unit being effectively displaced by a quarter of the period thereof in relation to the other unit whereby the device can produce separate electrical signals indicative of the real and imaginary parts of a Fourier transform of the distribution of intensity of radiation in said image at one or more spatial frequencies.

The term "image" is intended to cover images and silhouettes and is particularly directed to an optical image but it should be understood that the term is also intended to apply where electromagnetic radiation of frequencies other than the visible band is employed.

In a simple technique the signals can be applied to the X and Y plates of a cathode ray oscilloscope and the modulus and phase angle of the transform at any spatial frequency can be determined from the position of the spot on the face on the cathode ray tube.

In gauging techniques the position of the spot or any equivalent null voltage can form a convenient reference and deviations from this reference will speedily indicate departures from the standard property under investigation.

Other systems can be adopted for producing an processing the signals as will become more apparent hereinafter.

The invention may be understood more readily and various other features of the invention may become more apparent from consideration of a constructional embodiment thereof.

BRIEF DESCRIPTION OF DRAWINGS

Embodiments of the present invention will now be described, by way of example, only with reference to the accompanying drawings wherein.

DESCRIPTION OF PREFERRED EMBODIMENTS

Figures 1, 2:
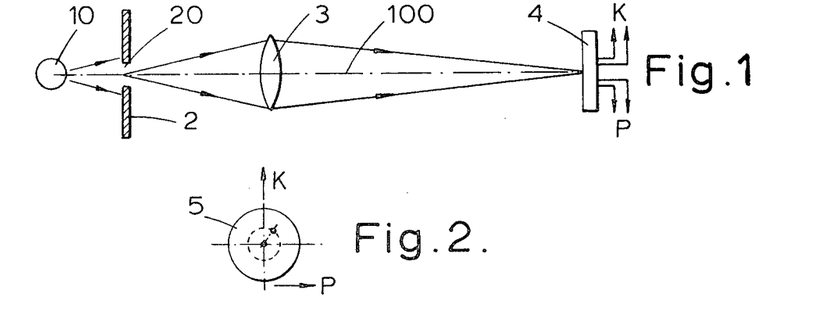
FIG. 1 is a schematic diagram depicting an apparatus made in accordance with the invention.
FIG. 2 is a view of the face of a cathode ray oscilloscope display associated with the apparatus of FIG. 1.

By way of example the apparatus shown in FIG. 1 is considered to be used in measuring the dimension of a gap or aperture 20 in a member 2. As shown in FIG. 1 the apparatus has a light source 10 which preferably forms a source of diffuse light for illuminating the aperture 20. A lens 3 serves to focus an image of the aperture 20 onto a detecting device generally designated 4. The numeral 100 denotes the optical axis of the apparatus. The device 4 described in more detail hereinafter produces two electrical output signals K and P which may be fed to the tube 5 (FIG. 2) of a cathode ray oscilloscope to form a visible display.

Figure 3:
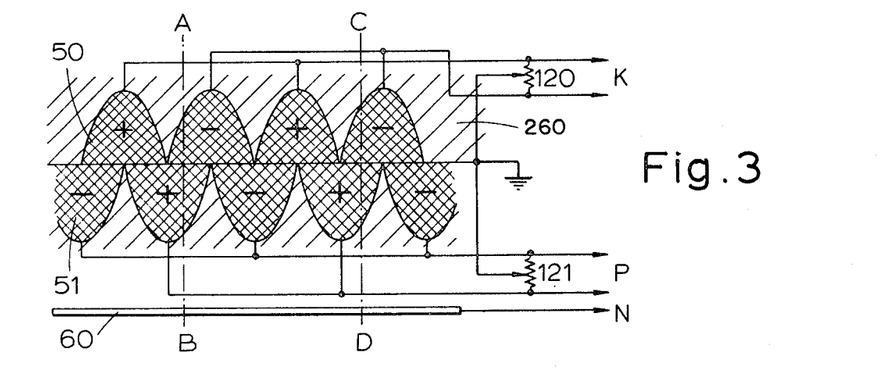
FIG. 3 is a representation of the detecting device of the apparatus shown in FIG. 1.

The device 4 is in the form of a plurality of photoelectric elements so arranged as to form two elongated units of cells 50, 51 each having a special sinusoidal sensitivity characteristic depicted diagrammatically in FIG. 3. In particular each unit 50, 51 exhibits a sinusoidal distribution or variation in sensitivity to light along one particular axis, in this case its length, and the units 50, 51 are arranged so that the sinusoidal variation of one unit is effectively displaced by 90° in relation to the other unit. Such an arrangement can be achieved by the use of masks as discussed hereinafter. Each unit 50, 51 comprises an array of electrically separate photo-electric elements. Alternate elements in each array and designated +, − are connected together in parallel so that a negative polarity terminal of each element is connected to a common earth connection and the other terminal of each element generates a positive potential with respect to this earth connection. The positive potential for each + element in each array is taken to a common conductor. The remaining elements designated − are similarly interconnected to produce a negative potential on a second common conductor for each array. The electrical signals from the units 50, 51 form the electrical signals or outputs designated K and P, the significance of which will be described more fully hereinafter. These outputs can be produced across variable resistors or potentiometers denoted 120, 121 in FIG. 3. As shown, each variable resistor 120, 121 is connected at one end to the photo-electric elements of its associated unit which produce a common maximum electrical potential, i.e., negative or positive, when exposed to light. The wipers of the variable resistors 120, 121 are in this example connected to the common bases of the photo-electric elements and to an electrical earth or ground potential representing a zero electrical signal from the units. A further "normal" photo-electric cell or unit in the form of an elongated array denoted 60 can be used to produce a reference signal denoted N.

Figure 4:
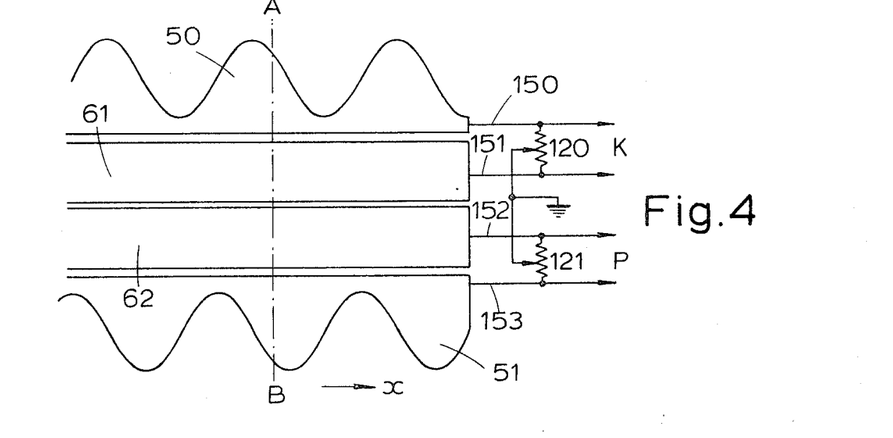
FIG. 4 depicts a modified detecting device.

A further example of a detecting device 4 is depicted in FIG. 4 where the sinusoidal arrays forming the units are again designated 50, 51 and two elongate arrays form units denoted 61,62. By way of example the signals K and P are again produced by the use of variable resistors or potentiometers 120, 121. The units 50, 51, 61, 62 can again be defined by the use of masks and the width of each of the units 61, 62 is equal to the mean width of the units 50, 51 so that the difference in the signals produced by 50 and 61 on the one hand and 51 and 62 on the other hand is a sinusoidal function for a band of light A B moving in the direction of arrow X. The relative alignment between the units 50, 51 is again such that if the output signal from units 50, 61, i.e., signal K is sinusoidal then the output signal from units 51, 62, i.e., signal P, is cosinusoidal.

The sinusoidal distribution of or variation in sensitivity of the units 50, 51 can be achieved in various ways, for example, photographic masks or moire gratings can be placed over a plane array of photo-electric elements.

In using the device 4 it may also be necessary to employ fibres or other light guides or light integrating devices to couple the light accepted by the receiving apertures of the mask to the photosensitive elements. For greatest uniformity between the characteristics of the cells or units 50, 51 etc., the device 4 is preferably constructed on a single silicon chip divided into its different areas by photo etching, and each area is accurately delineated by aluminum masks. To obtain an outline accuracy within 1 percent of peak value, the minimum sine wave amplitude should be in the order of 200 $\mu m$ and minimum sine wave period in the order of 400 $\mu m$. However, it is possible to make units for certain applications by using ordinary large area photocells and photographic masks, as to some extent the non uniformities average out for applications where the area illuminated is quite large. In the particular embodiment illustrated in FIG. 3 it is assumed that a mask 260 having shaped apertures therein is placed over a plane array of photoelectric elements. One element is arranged to receive light entering each of the respective areas designated + and −. The elements are electrically connected in four parallel groups; one group being composed of the elements receiving light from the upper areas designated +, a second group being composed of the elements receiving light from the upper areas designated −, and similarly a third and fourth group receiving light from the lower areas designated + and − respectively. The electrical connections depicted in FIG. 3 are diagrammatic and the connection associated with each area is to be understood as being made to the photocell or photocells associated with that area. The device 4 may be made several cm in length for gauging large apertures. Alternatively by using integrated circuit techniques the device can be made in the order of 100 $\mu m$ in length for use in microscopic systems.

Figure 5:
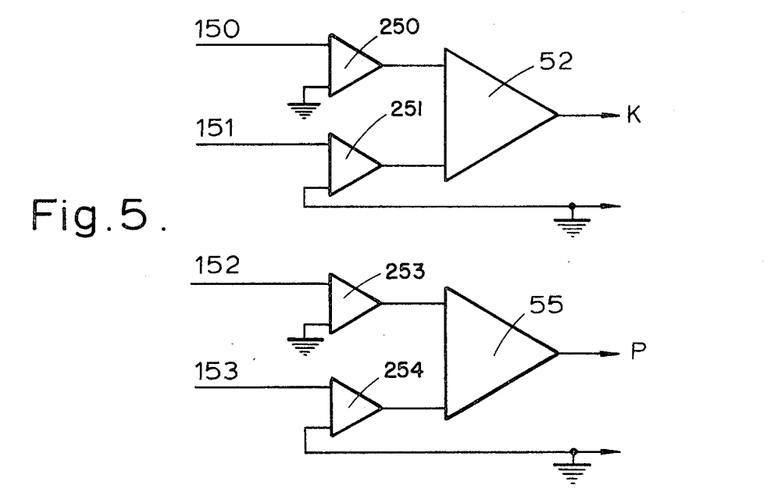
FIG. 5 is a schematic diagram depicting a modified signal derivation arrangement for the device of FIG. 4.

Instead of using the variable resistors 120, 121 to produce the output signals K and P an alternative arrangement employs operational amplifiers as shown in FIG. 5. The conductors denoted 150, 151 in FIG. 4 are connected to a first input of D.C. amplifiers 250, 251 respectively, and the conductors denoted 152, 153 in FIG. 4 are connected to a first input of D.C. amplifiers 253, 254, respectively. A second input of the amplifiers 250, 251, 253 and 254 is connected to earth or ground.

The outputs from amplifiers 250, 251 are connected to the inputs of a further D.C. amplifier 252 which acts to subtract the voltages at its inputs and the output of this amplifier 252 constitutes the output signal K. Similarly the outputs from amplifiers 253, 254 are connected to the inputs of a further D.C. amplifier 255 which acts to subtract the voltages at its inputs and the output of this amplifier 55 constitutes the signal P. Where very low levels of light are involved it may be preferable to use the outputs present on the conductors 150, 151, 152, 153 to modulate an A.C. carrier wave or to modulate these outputs and then to process the resulting signal by conventional A.C. methods.

Figure 6:
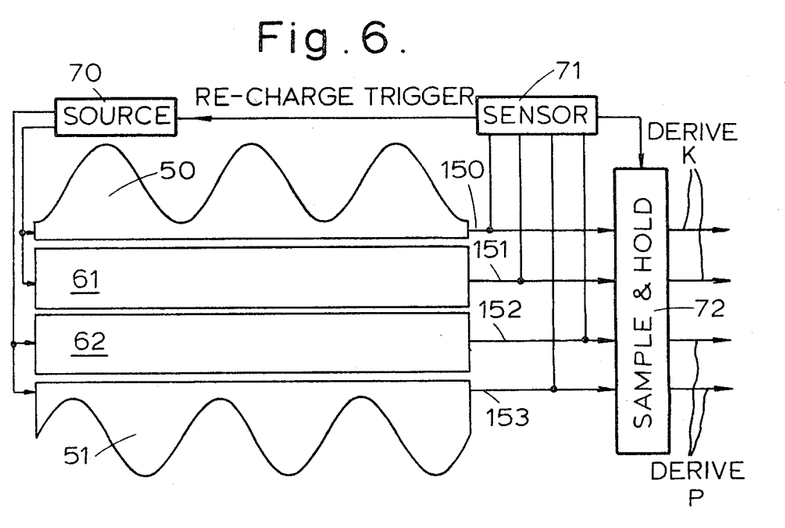
FIG. 6 depicts a further form of detecting device.

In a further arrangement depicted diagrammatically in FIG. 6, units of the device 4 are operated in a "charge storage" mode. In this mode of operation, each unit is effectively used as a capacitor which is initially charged to a reference voltage, and then discharges at a rate depending on the light flux falling on to it.

In order to produce the signals K for example the units 50, 61 would be charged simultaneously to a reference voltage from a controlled source 70. The units 50, 61 thereafter discharge at rates proportional to the amount of light falling on the units 50, 61. When the voltage produced by either unit 50, 61 reaches a lower reference level, a sensor 71 is activated and the difference between the voltages produced by the units 50, 61 is sampled and held by a sample and hold unit 72 incorporating D.C. amplifiers. Thereafter both units 50, 61 are recharged from the source 70. The next time voltage produced by the units 50, 61 reaches the lower reference level, the difference value is updated by sampling and holding the new value, and again the units 50, 61 are recharged. The signal P would be produced in a similar manner. This method has the advantage that the difference voltage which constitutes the signal K, P is independent of light level variations due to change in source brightness etc., which only effect the speed of operation. If the system operates much quicker than any expected change then the output is substantially a DC signal proportional to the difference between the outputs from the units 50, 61. Because an integration process is occurring in the photodetectors the signals to be handled are generally much larger than in the DC amplifiers of FIG. 5 and therefore the DC drifts in the amplifiers employed in the circuit 72 are proportionally smaller than in the arrangement of FIG. 5. In low light level applications where the required high gain of the amplifiers in FIG. 5 might produce unacceptably large drifts, this charge storage method of operation can be a better alternative than the more usual AC carrier system mentioned hereinbefore.

The significance of the signals K and P will now be discussed. Referring back to FIG. 3, suppose that a narrow band of light, A–B, which has a small width in comparison with the length of the units 50, 51 is allowed to fall onto the units 50, 51 and the band A–B is allowed to take successive positions from left to right along the units 50, 51, each position being defined by a distance $u$ from some datum fixed with respect to the units. The signals at the outputs K and P will depend on the distance $u$ for each position. If the signal at the output K is plotted against the distance $u$ it will give rise to a sinusoidal graph, and likewise the signal from output P will give rise to a further sinusoidal graph, the two graphs being displaced one from the other in the u-direction by a quarter of the period of each graph. Each of the two graphs may, with appropriate adjustment of scale, alternatively be regarded as a graph of the sensitivity of the respective unit 50 or 51 as a function of $u$, the displacement. For any given value of $u$ the two sensitivity values may be stated as a pair in the form of a complex number which may be called the complex sensitivity of the pair of units 50, 51. The signals K and P may, as shown in FIG. 2, be taken to the cathode ray tube 5, which for each value of $u$ will display a point, the locus of such points being a circle, whose radius will be dependent on the intensity of light in the strip A–B and on the gain of the oscilloscope.

Suppose now that the arrow line A–B is replaced by a band of light with a distribution of intensity given by $B(u)$, a function of $u$. An elemental strip at position $u$ will give rise to a component of signals K and P which may be found by multiplying the particular value of $B(u)$ by the complex sensitivity (for the same value of $u$) of the units 50, 51 to produce a complex number representing by one of the parts thereof the component of signal K and by the other of its parts the component of signal P. Since every such elemental strip in the band will in this way contribute a component of signal K and a component of signal P, the resultant signals K and P are determined by integrating the last said complex number over all possible values of $u$. The result is a further complex number of which one part represents the signal K and the other part represents the signal P; the number may be called $b(s)$ and is 1.
$$b(s) = \int_{-\infty}^{+\infty} B(u)\ (\cos 2\pi su + i \sin 2\pi su) du$$
$$= \int_{-\infty}^{+\infty} B(u)\ \exp\ (2\pi i su) du$$

where $s$ is the spatial frequency of the device 4, i.e., the reciprocal of the period of the sinusoidal sensitivity distribution thereof. The form of this expression is well known as the Fourier transform $b(s)$ of the function $B(u)$.

The real and imaginary parts of $b(s)$ will represent respectively P and K if the datum from which $u$ is measured is correctly chosen, and $u$ is a simple rectilinear displacement. $B(u)$ may be a function of other variables also, of which time is a simple but not sole example, and a second spatial dimension is a further example; furthermore $u$ may be a spatial variable of some other kind, such as for example a distance along a curved path.

If C is the real part of $b(s)$ then C, may be written as:

2.
$$C = \int_{-\infty}^{+\infty} B(u) \cos\ (2\pi su) du$$

and if S is the imaginary part, then s may be written as:

3.
$$S = \int_{-\infty}^{+\infty} B(u) \sin(2\pi s u) du$$

The modulus $M$ of the Fourier transform is given by:

$$M = (S^2 + C^2) \tag{4}$$

and the phase angle $\theta$ of the transform is given by:

$$\theta = \tan^{-1} S/C \tag{5}$$

Now the voltage produced by the uppermost unit 50 of the device 4, output K, is given by equation (3) since the former can be defined as the integral of each element of light intensity $B(u)$ over the shape or period of the mask i.e., $\sin(2\pi s u)$ for a given spatial frequency. Conversely, the output P is the real part C (equation 2) of the transform. Thus, equation 4 can be re-written as:

$$M = (K^2 + P^2) \tag{6}$$

By applying $K$ and $P$ to the cathode ray tube 5 the modulus M and associated phase angle $\theta$ can be determined from the position of the spot on the tube face where $P$ is fed to the X plates and $K$ to the Y plates. However, this technique requires constant interpretation of the image by an operator whereas it is prefered to derive a D.C. voltage proportional to $M$ and suitable for further processing by other means.

It is possible by means of operational amplifiers to solve the equation $M = (K^2 + P^2)$ for the modulus $M$. However the components required to carry out these operations of squaring and rooting are of rather low accuracy in the present state of the art.

An alternative method of determining $M$ is based on the fact that we may write $$K = M \sin \theta \tag{7}$$

$$P = M \cos \theta \tag{8}$$

where $\theta$ is the phase angle.

The signal K is modulated by a first carrier signal $\cos \phi$ where $\phi$ is proportional to time and the signal P is modulated by a second carrier signal $\sin \phi$ having the same temporal frequency and in temporal quadrature with the first carrier signal. signals $K^1 \, P^1$ can be produced which are given by:

$$K^1 = M \sin \theta \cos \phi \tag{9}$$

$$P^1 = M \cos \theta \sin \phi \tag{10}$$

and hence $$K^1 + P^1 = M \sin(\theta + \phi) \tag{11}$$

If this signal is demodulated, the modulus M can be recovered. Since a square wave is mathematically equivalent to the sum of a number of harmonic components of well defined amplitudes it is possible to chop with two square waves in temporal quadrature as an alternative to modulating with two sine waves in temporal quadrature. The signal $K^1 + P^1$ can then temporal-frequency be filtered to produce the fundamental term $\phi$ ($\phi$ must modulate much more quickly than $\theta$, so that one can filter for $\phi$) and the filtered signal finally demodulated. Alternatively the signal $K^1 + P^1$ can be demodulated and divided by an appropriate constant which is the ratio of an integrated square wave to its integrated fundamental component. Such techniques are well known per se.

Consider now that an image of the aperture 20 (FIG. 1) is formed on the device 4 and bounded by the lines A–B and C–D (FIG. 3). In this case $B(u)$ can be taken as unity within the image and zero outside and the Fourier transform of this function may be shown to be $$-\sin(2\pi a s)/2\pi a s \tag{12}$$

where the length of the image, i.e., along the units 50, 51 of the device 4, is $2a$. If the length of the image equals the period of the pattern or shape of the mask then $2a = 1/s$ (equation 12) and $M$ is zero, and the spot on the tube 5 remains undeflected independent of the position of the image of the aperture 20 on the device 4. If the image is either larger or smaller than this null setting the spot will be deflected a distance proportional to M and approximately proportional to the change of $a$ at least for a change in $a$ of about ±20 percent. Any movement of the image along the device 4 causes the spot to traverse a circular path of radius proportional to the change in $a$. If the position of the aperture in question is fixed there will be a 180° change in the phase angle $\theta$ as the width of the image passes through a value equal to the period of the sinusoidal pattern or mask. Since the spot occupies opposing quadrants of the display, as the image passes through the pitch of the period of the pattern or mask it is relatively simple to ascertain a position of balance where the image width exactly matches the mask or pattern period. Gauging techniques can thus be readily derived from this principle.

To avoid any possible drift due to the use of D.C. amplifiers the light emanating from the source 10 may be chopped. A difference between the actual size of the image and that size which produces a zero signal, provided that the difference is not too large, will then give rise to a vector displayed on the tube 5, the length of which vector is substantially proportional to that difference and whose direction will be dependent on the position of the image on the device 4. It has been assumed so far that the intensity of source 10 is constant. In practice, for any given size of the image and therefore of the said difference, the photoelectric signals K, P and therefore the length of the vector and the value of M will be proportional to the radiation falling on the device 4 and will therefore vary in accordance with any variations in the intensity of the source 10. This variation may be compensated for by the use as a reference of the normal elongate unit 60 shown in FIG. 3 with output N. It will be appreciated that for any particular period and therefore spatial frequency of the device 4 a particular value of the transform is obtained, and that if the device 4 is changed in spatial frequency, or an equivalent operation performed (such as altering the magnification of the image) then other values of the transform will be obtained; ways of changing the spatial frequency are further discussed hereinafter.

Alternatively, instead of chopping the light from the source 10 the image may be moved in an oscillatory fashion with respect to the device 4 so as to produce a circular display. The diameter of the display is then proportional to the difference between the pitch of the period of the pattern or mask and the width of the image of the aperture.

If a particular range of spatial frequencies needs to be covered, for example where the optical transfer function of a lens is to be measured, a range of masks with different pitches could be used or a single mask used in conjunction with a zoom lens. Alternatively, the pitch of the mask could be progressively decreased instead of being constant so that the Fourier transform over a continuous range of frequencies could be measured by moving the mask over the array of photo electric elements. The device 4 can also be used to measure the spatial frequency content of an optical image at a spatial frequency determined by the size of the device 4 and the magnification of an auxilliary optics required.

Optical systems may be evaluated by measuring their optical transfer function (otf) which is the ratio of the contrast in the image to the contrast in a test object consisting of a sinusoidal intensity distribution, over a range of spatial frequencies. For many systems, particularly for production testing of a single system, it is sufficient to measure the otf at a single spatial frequency. This may be done by using a test object with a well defined distribution of spatial frequencies, such as a fine slit or pinhole, and allowing the lens system under test to image this on to the sinusoidal array of elements of the device 4. The output M is then a measure of the contrast of the component of the image at the spatial frequency of the device 4. Thus otf equipment may be constructed which is potentially cheap rugged and simple and reliable.

It is also possible to detect defects in labels, photographs of objects or the like by determining differences in the Fourier Transform or frequency spectrum of the object compared with that of a perfect object. The advantage here is that information can be processed more quickly and precise alignment of the object is not necessary. Often it is sufficient to compare the transforms of the test and reference objects at only one spatial frequency, this having been chosen because of its sensitivity to the type of defect under inspection. In a particular application using the detecting device 4 with its sinusoidal array of elements the two objects can be imaged on to the device 4 by means of optical systems which scan the images across the device 4. The difference between the two derived respective outputs $M$ would be a measure of differences between the two objects.

Figures 7, 8, 9, 10, 11:
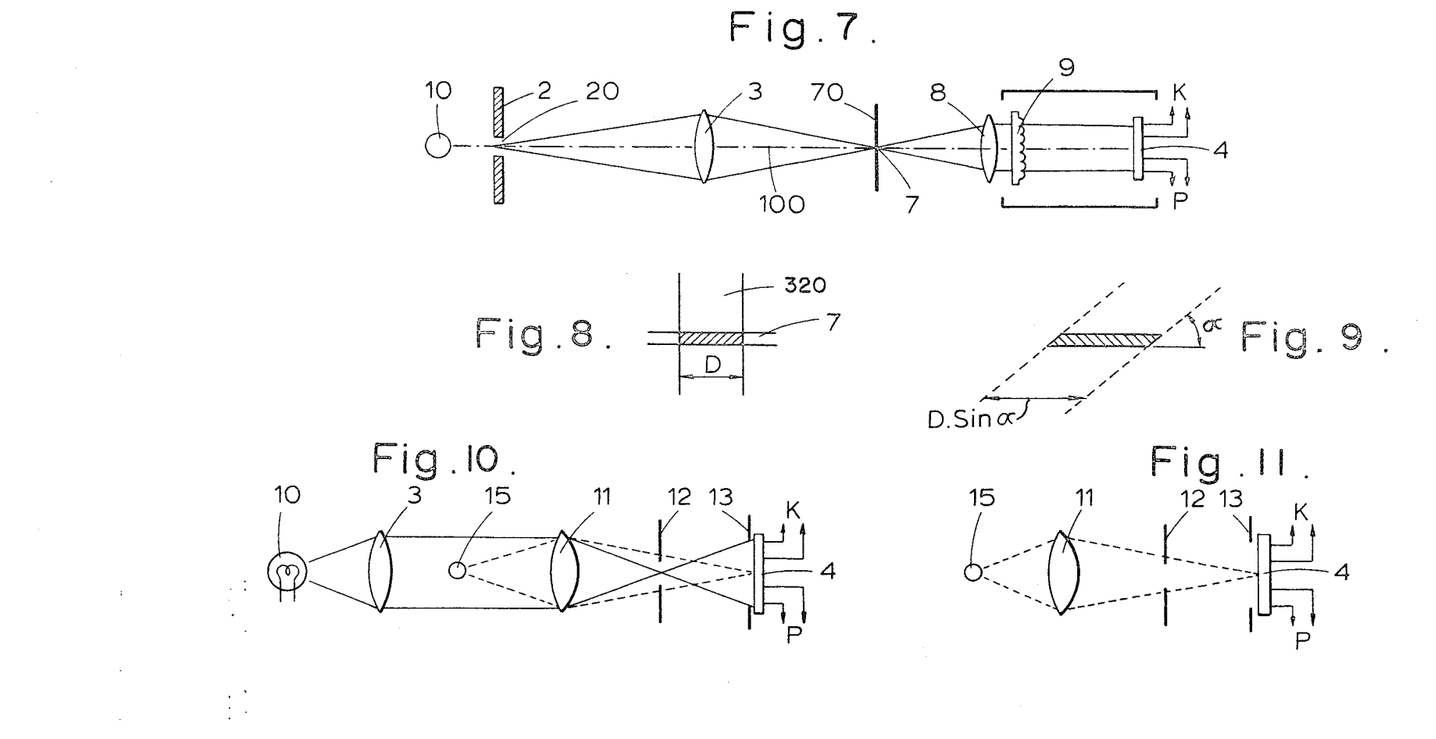
FIG. 7 is a schematic diagram depicting a modified apparatus made in accordance with the invention.
FIG. 8 depicts the optical relationship of certain of the parts of the apparatus shown in FIG. 7 in one operative position.
FIG. 9 depicts the same optical relationship as in FIG 8 but with the parts in another operative position.
FIG. 10 is a schematic diagram depicting a further apparatus made in accordance with the invention employed as a rod diameter gauge.
FIG. 11 is a schematic diagram depicting another apparatus employed as a rod diameter gauge.

Another apparatus which enables the size of the image of the object to be gauged to be varied with respect to the pitch of the sinusoidal pattern or mask is shown in FIG. 7 where the same reference numerals denote the same parts shown in FIG. 1. As shown in FIG. 8 an intermediate image 320 of the aperture 20 is formed on a narrow slit 7 which effectively isolates a small length of the aperture 20. This image 320 is then projected by a lens 8 on to the detecting device 4.

The relationship between the image of the aperture 20 and the slit 7 is shown in FIG. 8 where "D" denotes the width of the selected portion of the image. A unidirectional beam spreading device 9 which may take the form of a lenticular screen as depicted in FIG. 7, or a single cylindrical lens, is preferably positioned between the lens 8 and the device 4. The device 9 spreads the incoming image at right angles to the length of the device 4 so as to convert the isolated image into a band of light the width of which can be measured by the device 4. The width of this band can be varied by angularly displacing the deivces 9 and 4 about the central optical axis 100. If, the angle between the axis of the devices 4, 9 and the longitudinal direction of the selected portion of the image of the aperture of width D is $\alpha$, then the width of the band of light produced on the device 4 is D sin $\alpha$ as represented in FIG. 10.

In operation the image of the aperture 20 is made larger than the period of the mask with $\alpha$ initially zero, and then the devices 9 and 4 are partially rotated together relative to the slit 7 by an angle $\alpha$ until the relationship D sin $\alpha$ equals the period of the pattern or mask. Thus the width of the aperture can be found from the angle $\alpha$ and period of the pattern or mask.

It should be noted that the invention is applicable to the measurement or gauging or inspection of a variety of objects and the description of the gauging of an aperture or the determination of the otf of an optical system are merely given by way of a specific example.

Rods or wires which may be at an elevated or normal temperature can be gauged in accordance with this invention. In general, cold rods would be illuminated from behind by a source of limited extent. For example the aperture 20 in FIG. 7 may be made of a dimension such that the image thereof on the device 4 spans two whole periods of the pattern or mask of the device 4 to produce a null deflection of the spot on the tube 5. Gauging errors are revealed as deflections on the spot of the tube 5 in a similar fashion to the gauging or measurement of an aperture. Without using two devices 4 with units having sinusoidal variation of different frequency, or working well away from the null, it is possible only to detect changes of diameter in rods and the like not the sense of the change. However, if the sign of the error is known, e.g. an extrusion die worn beyond limits, where the diameter will steadily increase, then the type of gauge employing a single device 4 could be used in a go-no go sense. In this regard, it would be possible to construct a gauge with a go-no go output which could be periodically examined to discover the sense of the error for the purpose of readjustment.

Examples of diameter gauges are shown in FIGS. 10 and 11 where FIG. 10 depicts a cold rod guage and FIG. 11 depicts a hot rod gauge. In FIGS. 10 and 11 like reference numerals denote like parts to those shown in FIG. 1. In both arrangements the rod under investigation, denoted 15, is imaged by a lens 11 on to the device 4, via a telecentric stop 12 which makes the image size on the device 4 independent of the axial position of the rod 15. In the case of the cold rod, FIG.

10, a condenser optical system is used to illuminate the rod 15 from the source 10 but an integrating sphere or the like could be used instead. The device 4 has a field stop 13 and the construction of the device 4 allows for vertical movement of the rod 15 because while the size of the rod 15 would normally correspond to one cycle of the pattern or mask at the null point the pattern or mask may be many cycles in length.

It is necessary to have the field stop 13 to limit the extent of the illumination on the device 4 to an integral number of cycles which would by itself produce no output signal. This feature also is desirable in the hot rod gauge, FIG. 12, in order to reduce the effects of ambient light. Accuracy may be increased by the use of one device 14 for each edge of the rod to be gauged, the two devices being operatively coupled together. Then if there are effectively N cycles in the width of the rod, the accuracy of gauging is increased by a factor of N.

The process of integration represented by equations (2) and (3) can also be effected by reversing the direction of the light beam shown in FIG. 1. In this arrangement a multiple light source is disposed in the position of the device 4 in FIG. 1 and this multiple light source forms two alternative sections chopped in anti-phase over which is placed the mask described in connection with the device 4. The two offset portions of the mask are each illuminated by one of the alternative sections. Two photo-sensitive devices are placed one above the other in the general position of the source 1 in FIG. 1 and correspond to the mask 60. It is arranged that the output from each of these devices is fed to a phase sensitive rectifier having as a reference input a signal derived directly from the light source. The signals from the phase sensitive rectifiers constitute the real and imaginary parts of the Fourier transform, i.e., $K$ and $P$, as described hereinbefore. The apparatus effectively has two separate channels known as the real and imaginary channels and the phase sensitive rectifiers produce signals proportional to the sine and cosine of the position of the source image on the aperture 20.

To reduce the possibility of light from the one section energising the photo-sensitive device associated with the other section, the channels can be provided with colour filters which transmit selective bands of the visible wavelengths to which the photo-sensitive devices are sensitive. Other means for achieving this result could be used for example light polarizers or special chopping techniques.

It is envisaged that this latter described arrangement would be less affected by stray light since this would not normally be fluctuating in the characteristic manner described.

The detecting device 4 of the invention also has application in the field of colorimetry and the measurement of temperature by associated spectral plane analysis.

We claim:

1. A method of gauging, inspecting or measuring a physical property of an object comprising the steps of providing a detecting device having two units sensitive to electromagnetic radiation and each exhibiting a sinusoidal distribution in radiation sensitivity along a predetermined path with the sinusoidal distribution of one unit being effectively displaced by a quarter of the period thereof in relation to the other unit, forming an image of said object on said detecting device and producing from said detecting device first and second electrical signals indicative, respectively, of the real and imaginary parts of a Fourier transform of the spatial distribution of the intensity of radiation in said image.

2. A method according to claim 1, further comprising modulating an A.C. carrier wave with the outputs from the units and processing and demodulating the resultant waveform to produce said signals.

3. A method according to claim 1, further comprising feeding the outputs from the units into a combination of D.C. amplifiers to produce said signals.

4. A method according to claim 1, further comprising feeding the outputs from the units to potentiometers to produce said signals.

5. A method according to claim 1, further comprising charging the units to a high reference voltage and allowing the units to discharge according to the amount of radiation received thereby.

6. A method according to claim 5, further comprising charging each of two elongate units sensitive to said radiation and constituting part of said detecting device to a high reference voltage simultaneously with an associated one of said two units, allowing said elongate units to discharge according to the amount of radiation received thereby, and feeding the difference in the outputs from each of said two units and its associated elongate unit to a sample and hold means whenever the output from either of said units reaches a low reference voltage.

7. A method according to claim 1 further comprising applying said first and second electrical signals to the X and Y plates of an oscilloscope.

8. A method according to claim 1, further comprising modulating each of said signals with a carrier wave, one signal being modulated in a sinusoidal manner and the other signal being modulated in a co-sinusoidal manner, adding said modulated waveforms and demodulating the resultant waveform to produce a voltage proportional to the modulus of the Fourier transform.

9. A method according to claim 1, further comprising making the period of said sinusoidal distributions equal to the size of the image of a reference object to produce a zero modulus for the associated Fourier transform and gauging other objects by determining the change in modulus produced thereby.

10. A method according to claim 1, further comprising altering the period of said sinusoidal distribution to cover a range of spatial frequencies.

11. A method according to claim 1, further comprising forming an image of a reference object scanning the images across the device in the direction of said sinusoidal distribution, deriving a voltage proportional to the modulus of the Fourier transform for each image from the electrical signals associated therewith, and comparing the modulus of one image with that of the other image.

12. A method according to claim 1, further comprising defining said image with a slit and partially rotating the detecting device relative to the slit until the size of the defined image equals the period of the sinusoidal distribution.

13. An apparatus for gauging, inspecting or measuring some physical property of an object; said apparatus comprising means for forming an image of the object, a detecting device for receiving said image of the object, said device having two units sensitive to electromagnetic radiation, each unit exhibiting a sinusoidal distribution in sensitivity to said radiation along a predetermined path, with the sinusoidal distribution of one unit being effectively displaced by a quarter of the period thereof in relation to the other unit, and means, including said detecting device, for producing separate electrical signals indicative of the real and imaginary parts of a Fourier transform of the distribution of intensity of radiation in said image at at least one spatial frequency.

14. An apparatus according to claim 13, further including a first pair of outputs connected to one of said two units and a second pair of outputs connected to the other of said two units and a first potentiometer coupled to said first pair of outputs and a second potentiometer coupled to said second pair of outputs.

15. An apparatus according to claim 13, wherein the detecting device further includes two additional units each formed from an elongate array of radiation sensitive elements, the output of each of said elongate units being operably connected to the output of one of said two units.

16. An apparatus according to claim 15, further including first and second potentiometers, the output of each elongate unit being connected to the output of its associated one of two units through one of said potentiometers, said first and second electrical signals being taken from the potentiometers.

17. An apparatus according to claim 15, wherein a plurality of D.C. amplifiers are provided to combine the outputs from said units and produce said signals.

18. An apparatus according to claim 15, further comprising means for charging the units to a high reference voltage, the units being thereafter allowed to discharge at a rate dependent upon the radiation received thereby, means for sensing whenever the output from the units reaches a low reference voltage, and means activated by said sensing means for sampling the difference between the outputs of one of the said two units and its associated elongate unit and for storage of the difference value.

19. An apparatus according to claim 13, further including means for modulating an a.c. carrier wave, means for producing said carrier wave, the outputs from said two units being connected to said modulating means to modulate the a.c. carrier wave and means for processing and demodulating the resultant waveform to produce said first and second electrical signals.

20. An apparatus according to claim 13, wherein the detecting device is provided with a planar mask at least defining said two units.

21. An apparatus according to claim 20, further comprising radiation guides devices to couple radiation from the open areas of the mask to the photoelectric elements.

22. An apparatus according to claim 13, wherein the detecting device comprises a photo-etched silicon chip and a planar mask to delineate the areas forming the units.

23. An apparatus according to claim 22, further comprising radiation guides devices to couple radiation from the open areas of the mask to the photoelectric elements.

24. An apparatus according to claim 13, further comprising an oscilloscope the X and Y plates of said oscilloscope being responsive to said first and second electrical signals, respectively.

25. An apparatus according to claim 15, further comprising means for modulating each of said signals with a carrier wave, one signal being modulated in a sinusoidal manner and the other signal being modulated in a cosinusoidal manner, means for adding said modulated waveform and means for demodulating the resultant waveform to produce a voltage proportional to the modulus of the Fourier transform.

26. An apparatus according to claim 13, further comprising operational amplifiers receiving said signals and arranged to produce a voltage proportional to the modulus of the Fourier transform.

27. An apparatus according to claim 13, further including means for varying the period of the sinusoidal distribution in sensitivity of the units of the detecting device.

28. An apparatus according to claim 13, wherein there is additionally provided means for forming an image of a reference object on the device, means for scanning the images of the object under investigation and the reference object across the device in the direction of said sinusoidal distribution means for deriving from the signals associated with each image a voltage proportional to the modulus of the Fourier transform of the image, and means for comparing the modulus of one image with the modulus of the other image.

29. An apparatus according to claim 13, wherein the image forming means includes a source of radiation and one or more lenses.

30. An apparatus according to claim 29, further comprising means for chopping the radiation from said source.

31. An apparatus according to claim 13, wherein the image formed by the image-forming means is defined by a slit further including means for partially rotating the detecting device relative to said slit.

32. An apparatus according to claim 13 further comprising a linear elongate strip of radiation-sensitive elements extending along said predetermined path so as to receive said image and produce a reference signal thereform.

* * * * *